Feb. 13, 1962 C. H. BARNETT ET AL 3,021,398

CONTINUOUS CHECKING OF CIRCUIT CONTINUITY OF A SIGNALING SYSTEM

Filed May 26, 1960 3 Sheets-Sheet 1

INVENTORS C.H. BARNETT
W.V.K. LARGE
H.M. PRUDEN

BY Patrick J. Roche

ATTORNEY

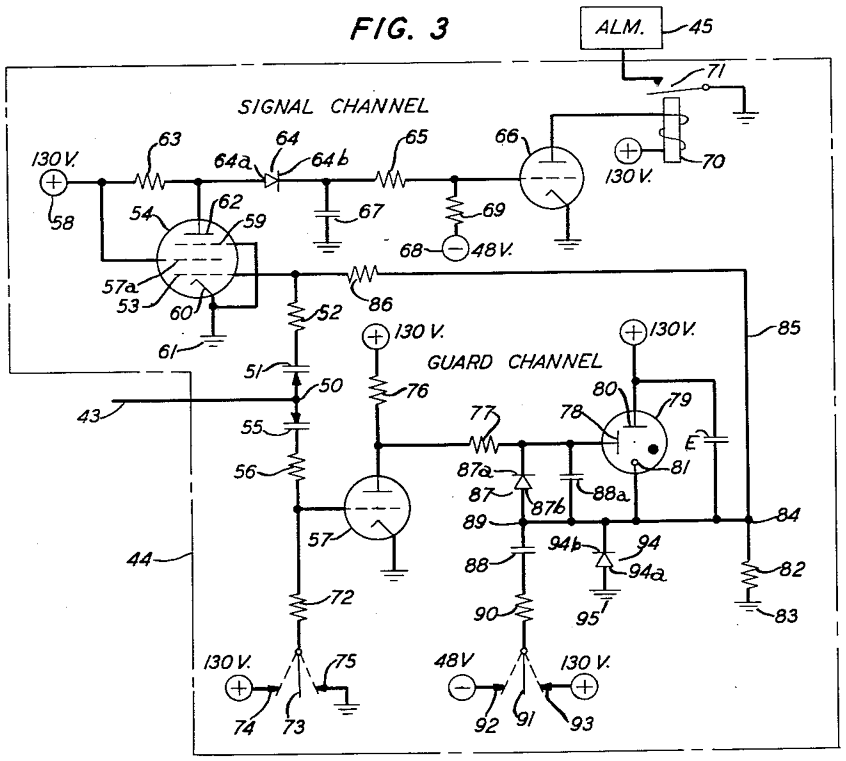
FIG. 3
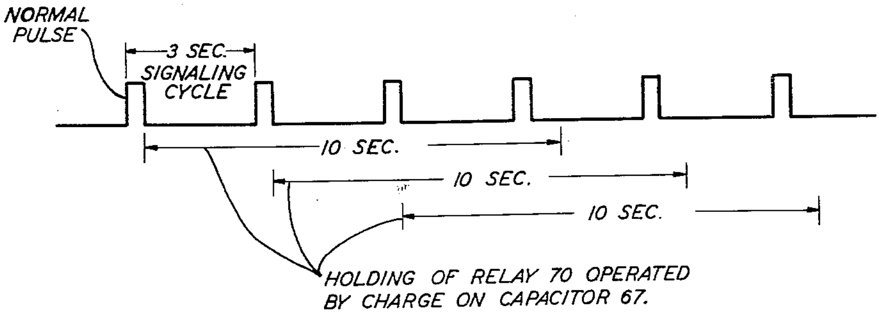
INVENTORS C.H. BARNETT
W.V.K. LARGE
H.M. PRUDEN
BY Patrick J. Roche
ATTORNEY INVENTORS C.H. BARNETT
W.V.K. LARGE
H.M. PRUDEN
BY Patrick J. Roche
ATTORNEY United States Patent Office 3,021,398

Patented Feb. 13, 1962

3,021,398

CONTINUOUS CHECKING OF CIRCUIT CONTINUITY OF A SIGNALING SYSTEM

Cecil H. Barnett, Prairie Village, Kans., Wayne V. K. Large, Locust Valley, N.Y., and Harold M. Pruden, Maplewood, N.J.; said Barnett assignor to American Telephone and Telegraph Company, New York, N. Y., and said Large and said Pruden assignors to Bell Telephone Laboratories, Incorporated, New York, N. Y., both corporations of New York Filed May 26, 1960, Ser. No. 31,924

19 Claims. (Cl. 179—175.3)

This invention relates to a signaling system, and more specifically to such system for registering positive voltage pulses received in each of a plurality of signaling cycles of preselected time duration and for blocking the registration of false or "hit" voltage pulses received after the registration of signal pulses in the respective signaling cycles. This invention provides the continuous checking of the circuit continuity of a signaling system.

In a known signaling system extending between a main headquarters station and a plurality of subsidiary stations and utilized for retaliation aircraft alerting, the system may be used under nonalert conditions for voice transmission among the several stations as well as for the transmission of an alert signal from the headquarters station to the subsidiary stations under emergency circumstances. It is therefore imperative that the overall system should be maintained in an operative condition at all times for the transmission of the alert signal to all subsidiary stations, if and when it should be originated at the headquarters station. If, on the other hand, it should happen that a particular circuit is incapable of handling a transmitted signal, this should be made known immediately to the headquarters station so that appropriate steps may be taken thereat to clear the troubled circuit and at the same time to provide for an alternate route between the headquarters and subsidiary stations.

The present invention therefore contemplates continuous checking of the circuit continuity of the system to activate suitable alarms in the event of the occurrence of an interruption in such continuity for at least a predetermined time interval.

It is the main object of the invention to check continuously the circuit continuity of a signaling system.

It is another object to announce the occurrence of an interruption in the continuity of a signaling system after at least a predetermined time interval.

It is a further object to provide the effect of "hits" or false signaling pulses in the operation of the continuous checking of the circuit continuity of a signaling system.

It is another object to announce the occurrence of "hits" at a certain repetitive rate for at least a predetermined time interval in the continuous checking of the circuit continuity of a signaling system.

It is a further object to minimize the effects of "hits" occurring at random time intervals in the continuous checking of the circuit continuity of a signaling system.

It is an additional object to monitor the continuous checking of the circuit continuity of a signaling system for the occurrence of "hits.'

In association with a signaling system including at least a transmitting terminal and a receiving terminal interconnected by suitable transmission circuits effective for opposite directions of transmission, the present invention for effecting a continuous checking of the circuit continuity of the signaling system comprises a generator of positive signal voltage pulses, each occurring once at the beginning of each of a plurality of repetitive signaling cycles of preselected time duration, located at the transmitting terminal and a receiver for the repetitive testing voltage pulses and/or "hit" voltage pulses also located at the same terminal. The signal and "hit" voltage pulse receiver comprises an input terminal common to a signal registration channel and to a "hit" voltage monitoring or guard channel. The signal channel consists of one of two capacitors connected in parallel to the common input terminal, an amplifier having a control grid and an anode and normally in a conducting condition, a first resistor included in series between the first capacitor and control grid, a second amplifier including a control grid and an anode, the last-mentioned grid connected to the first amplifier anode and the second amplifier anode connected to the operating winding of electromagnetic relay which has a break contact connected to an alarm circuit, the second amplifier normally conducting to energize the relay winding to open the break contact for deactivating the alarm circuit, a third capacitor having one terminal connected to the first amplifier anode and the second amplifier control grid and having an opposite terminal connected to ground, and a resistive path connected between a point common to the first resistor and the first amplifier grid and ground for discharging the first capacitor. It will be assumed for the moment in the signal channel that the first capacitor is discharged, the first and second amplifiers are conducting, the relay is operated to hold open the break contact thereby deactivating the alarm circuit.

The "hit" or guard channel includes the second of the afore-mentioned two parallel capacitors connected to the common input terminal, a third amplifier having a control grid connected to the second capacitor and also including an anode, the third amplifier being normally in the conducting condition, a first movable contact having one terminal connected to the second capacitor and third amplifier grid and an opposite terminal connectable alternately between a source of positive voltage and a ground terminal, a gas tube having a starter anode, a main anode and a cathode, the starter anode connected to the third amplifier anode, the main anode connected to the positive voltage source, and the cathode connected to an intermediate point on the resistive discharge path for the first capacitor, and a fourth capacitor having one plate connected to the gas tube starter anode and cathode, the fourth capacitor also having an opposite plate connected to a fixed terminal of a second movable contact whose opposite terminal is alternately connectable between a source of negative voltage and the positive voltage source. It will be assumed for the moment in the guard channel that the second capacitor is discharged, the third amplifier is conducting, and the gas tube is in the nondischarge condition.

The operation of the continuous continuity checking is effected simultaneously with the normal voice signaling taking place on the transmission circuit so that the signal generator is continuously applying positive signal pulses, one at the beginning of each signaling cycle of preselected time duration, to the transmitter terminal of the signaling circuit, and such pulses are being continuously accepted at the pulse receiver at the same terminal of the transmitting circuit which is being assumed at the moment to be free from circuit interruptions. While the signal pulse of the first signaling cycle is effective at the common input terminal, both the first and second capacitors will be charged. At the termination of the pulse, however, the first capacitor will commence to discharge thereby so negatively biasing the first amplifier control grid as to drive the latter amplifier into the nonconducting condition. As a consequence, the third capacitor will be charged to the full positive voltage of the first amplifier anode. This positive capacitor charge effective on the second amplifier control grid will serve to maintain the second amplifier in conduction, the relay operated, the break contact opened, and the associated alarm circuit deactivated. The third capacitor charge will hold the second amplifier conducting for a predetermined time interval which is at least three times longer than the preselected time interval of each signaling cycle. The first capacitor will discharge in due course through the resistive path connected therewith.

The first signal pulse of the first signaling cycle effective at the common input terminal will also charge the second of the two parallel capacitors. Upon the termination of the pulse, the second capacitor will discharge to bias negatively the control grid of the third amplifier and thereby tend to drive the latter into nonconduction. At the same time the positive voltage source effective on the first movable contact will counteract the negatively biasing voltage due to the discharge of the second capacitor whereby the third amplifier is held in conduction. This completes the registration period of the signal pulse in the signal channel during a first signaling cycle. Now, the pulse receiver is conditioned to monitor the common input terminal for a "hit" or other false pulse effective thereat in the remaining portion of the first signaling cycle. Assuming no false pulse occurs on the transmission circuit, then no further action takes place in the pulse receiver. This completes the guard monitoring time during the remaining portion of the first signaling cycle.

In the next-succeeding or second signaling cycle, it will be assumed that the normal signal pulse is registered in the signal channel during the signal registration time thereof, while the first movable contact is connected to the positive voltage source, in the afore-described manner; and also that a false pulse occurs in the remaining portion of the second signaling cycle. Now, such false pulse will charge the first capacitor again; and the negative biasing voltage due to the discharge of the first capacitor will tend to bias the first amplifier into nonconduction but such biasing voltage is overridden in a manner that will presently appear. At this point it will be understood that since the first movable contact is now resting on the ground terminal, the false pulse will charge the second capacitor. As one plate of the second capacitor is connected to the control grid of the third amplifier, the negative voltage effective on this plate biases the third amplifier into nonconduction whereby the full voltage of the third amplifier anode will be applied to the starter anode. This drives the gas tube into discharge. The path of discharge for the gas tube will be via the portion of the resistive path between the intermediate point thereof and ground whereby the voltage produced across the last-mentioned resistive portion will be applied through the remaining portion of the resistive path to the first amplifier control grid. The last-mentioned voltage will override the afore-noted biasing discharge on the first capacitor due to the false pulse thereby holding the first amplifier in conduction. As a consequence the false pulse will not be registered in the signal channel; and the first amplifier will be held in conduction until after the beginning of the third signaling cycle whereby the normal signal pulse of the latter cycle will not be registered, due to blocking of the signal channel as occasioned by the operation of the guard channel in response to the receipt of the false pulse.

At the beginning of the third signaling cycle, the second movable contact is resting on the negative voltage source terminal whereby the plate of the fourth capacitor connected to the starter anode and gas tube cathode is charged with a positive voltage equal to that of the last-mentioned source which is added to the cathode voltage of the discharging gas tube. At the end of the signal registration period of the third signaling cycle, the second movable contact is now resting on the positive voltage source terminal whereby the voltage thereof is effectively added to the voltage then effective on the fourth capacitor. This provides a cumulative voltage "kick" simultaneously to the starter anode and cathode of the gas tube which "kick" raises the voltage of the last-mentioned starter anode and cathode above the voltage of the associated main anode whereby discharge in the gas tube is extinguished. Thus, the gas tube is extinguished at the end of the signal registration period of the third signaling cycle. At the beginning of the fourth signaling cycle, the second movable contact is then resting on the negative voltage source terminal whereupon the fourth capacitor is discharged and the overall pulse receiver is conditioned to accept the next signal pulse and thereafter to monitor for false pulses.

One feature of the invention is that each registration of a legitimate signal pulse in the signal channel serves to hold the alarm circuit deactivated for the predetermined time interval so that if a legitimate signal pulse is not received during that time interval the alarm circuit will be activated to announce visibly and audibly the occurrence of an interruption in the overall signaling circuit.

Another feature is that the guard circuit blocks the registration of false pulses by the signal channel thereby precluding the deactivation of the alarm circuit for the predetermined time interval by such pulses.

Still another feature is that the guard circuit remains inactive so long as "hit" or false pulses do not occur.

Another feature is that the signal channel will effect an alarm whenever a circuit interruption continues for a time interval in excess of the predetermined time interval.

The invention will be readily understood from the following description when taken together with the accompanying drawing in which:

FIG. 3 is a schematic diagram of a specific embodiment of the invention utilized in FIG. 2; and FIGS. 4 and 5 comprise groups of curves illustrating action obtainable in FIG. 3.

Figure 1:
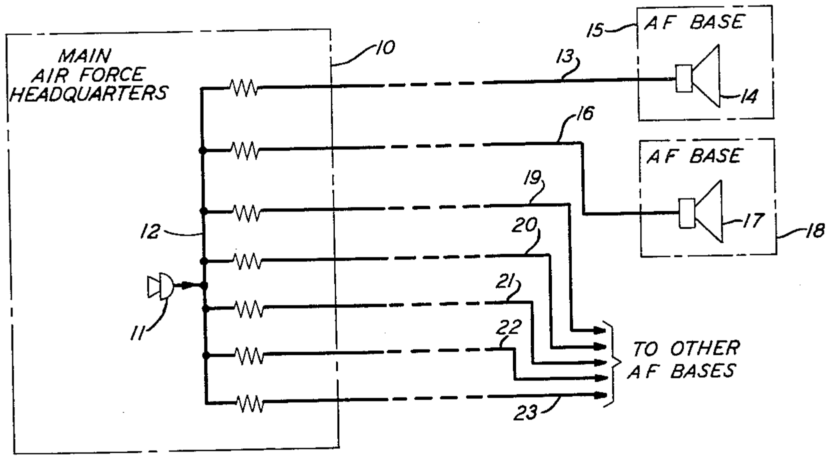
FIG. 1 is a single line diagram of a signaling system which may include a specific form of the invention delineated in FIG. 3.

A signaling system shown via single line diagram in FIG. 1 and adapted to include the present invention described below comprises a main air force headquarters 10 including telephone equipment 11 suitable for originating an alert signal on an emergency basis and connected to a ready-to-use voice-frequency signaling system 12. The system connects the alert telephone via direct circuit 13 to a loudspeaker 14 positioned in air force base 15 and direct circuit 16 to a loudspeaker 17 positioned in air force base 18. In a similar manner the alert telephone may be connected via circuits 19 through 23 to like loudspeakers at other air force areas, not shown. It is therefore evident in FIG. 1 that an alert signal originating in the telephone equipment located at the main air force headquarters in a manner mentioned later herein may be simultaneously transmitted at a given moment to all air force bases and received thereat substantially at the same time, provided that all interconnecting circuits are in an operative condition. In this connection, it will be understood that while the main air force headquarters is shown connected to two air force bases, it may also be connected via the circuits 19 through 23 to a plurality of other air force headquarters and bases in a similar manner. As a consequence, the present invention referred to hereinafter is directed to equipment for enabling a continuous checking of the continuity of the several circuits interconnecting the main headquarters with the several air force headquarters and bases in a manner that will be subsequently described.

Figure 2:
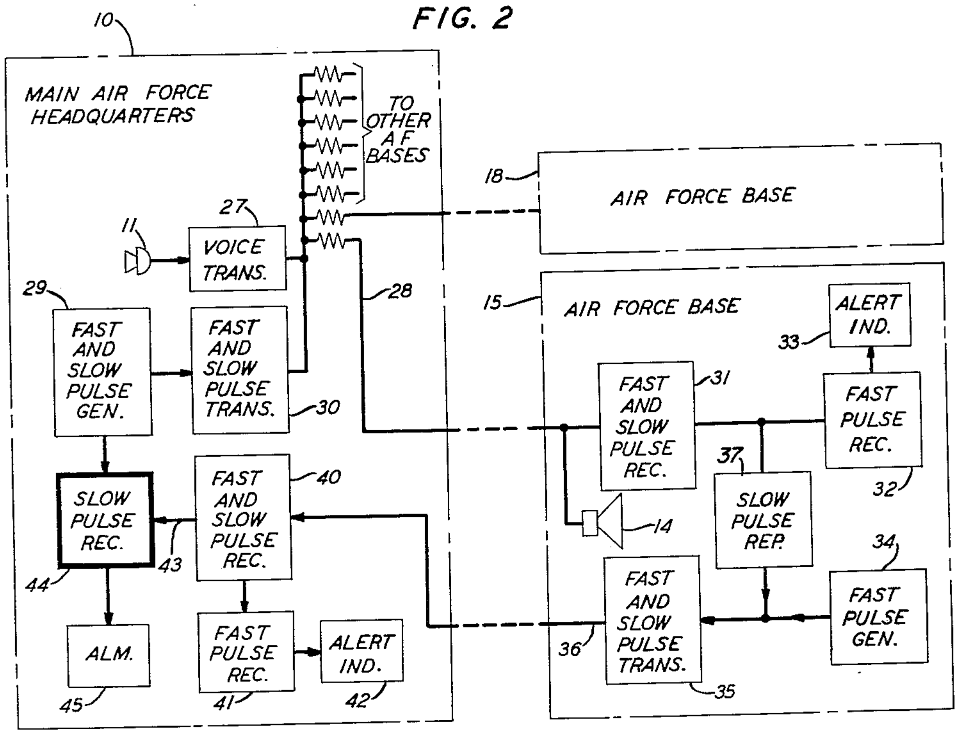
FIG. 2 is a block diagram of the signaling system shown in FIG. 1 and utilizing the invention illustrated in FIG. 3.

Referring now to FIG. 2 which shows the system of FIG. 1 in a box diagram and includes the same reference numerals for identifying corresponding equipments in both figures, the main air force headquarters 10 includes the alert telephone 11 connected through suitable voice transmitting equipment 27 to an outgoing transmission line 28 adapted in the well-known manner, not shown, for signaling transmission in the direction from left to right in FIG. 2. In the main headquarters, a fast and slow pulse generator 29 is connected to the input of a fast and slow pulse transmitter 30 whose output is also connected to the outgoing line 28. This transmission line, in air force base 15, is terminated in loudspeaker 14 and also in the input of a fast and slow pulse receiver 31 whose output is connected to a fast pulse receiver 32, and an alert indicator 33 in sequence.

Also, in air force base 15, a fast pulse generator 34 is connected to the input of a fast and slow pulse transmitter 35 which is identical with transmitter 30 and which has its output connected to an outgoing transmission line 36 extending from air force base 15 to the main headquarters 10. The line 36 is adapted in the well-known manner, not shown, for signaling transmission from right to left in FIG. 2. In addition, at air force base 15, a slow pulse repeater 37 is connected from the output of receiver 31 to the input of transmitter 35. At the main headquarters 10, line 36 terminates at the input of a fast and slow pulse receiver 40 which is identical with the receiver 31 and which has one output connected to a fast pulse receiver 41 and alert indicator 42 in sequence.

In the operation of the signaling system thus far described with reference to FIGS. 1 and 2, the initiation of an alert at the main headquarters is effected by actuating a suitable button, not shown, on pulse generator 29. This will cause the production of fast pulses, each having a time duration of say, for example, 100 milliseconds, occurring at the rate of five pulses per second on a direct-current basis. The direct-current pulses will be translated into corresponding alternating-current pulses in transmitter 30 in the well-known manner and applied to line 28. At the air force base, the alternating-current pulses are retranslated into fast direct-current pulses which are identical with those produced in the generator 29 at the main headquarters. These fast direct-current pulses are applied to fast pulse receiver 32 which is thereby caused to activate alert indicator 33 for activating an audible signal and/or flashing a lamp, not shown. It will be understood that the fast direct-current pulses in the output of receiver 31 are rejected by the slow pulse repeater 37 for the reasons disclosed in our copending application assigned to same assignee of the instant application. Alert indicator 33 includes a second key, not shown, for turning it off.

The activation of alert indicator 33 informs the personnel at the air force base that an alert signal is impending. This personnel acknowledges receipt of the alert signal to the main headquarters by actuating a key, not shown, but included in fast pulse generator 34 which proceeds to generate new fast pulses on a direct-current basis. These fast pulses are translated into corresponding alternating-current pulses by pulse transmitter 35 and sent out over line 36 to the main headquarters. At the latter point, the received alternating-current pulses are retranslated into direct-current pulses and applied to fast pulse receiver 41. This receiver is thereby caused to activate alert indicator 42 which announces an audible signal and/or flashes a lamp, not shown. This informs the main headquarters that the impending alert was received at the air force base and the personnel thereat are awaiting further information.

Now, the duty officer at the main headquarters speaks his message into alert telephone 11 thereat. This message, sent out over line 28 on a voice-frequency basis in the well-known manner, is received at the air force base and translated via loudspeaker 14 thereat into an audible message of appropriate level for announcing the details of the alert to all personnel located in proximity of the loudspeaker at that time. In a similar manner, the main headquarters may communicate with air force base 18. In the foregoing operation, it will be understood an appropriate band elimination filter, not shown, will be included in voice transmitter 27 at the main headquarters to preclude interference of the voice currents with the receiver 31 at the air force base when the latter is operating in an equivalent frequency range. In one instance, for example, the pulse transmitter 30 and receiver 31 may operate to send and receive, respectively, frequency modulated signals centered at a midfrequency of 2635 cycles per second for the one direction of transmission whereas the transmitter 35 and receiver 40 may operate to send and receive frequency modulated signals centered at 2465 cycles per second for the opposite direction of transmission. While the circuit of FIG. 2 omits normal telephone sets for the purpose of simplifying the instant description, it will be understood that such sets may be utilized at the main headquarters and air force bases to enable voice communication therebetween in the well-known manner when the overall signaling system is not being employed to transmit alert signals; and further the last-mentioned telephone sets will include band elimination filters for the purpose hereinbefore mentioned.

The present invention involving a slow pulse receiver 44 shown in heavy lines in FIG. 2 and usable for the continuous checking of the continuity of the simplified signaling system illustrated in FIGS. 1 and 2 will now be described. Referring to FIGS. 1 and 2, it will be assumed that the signaling system is functioning in a non-alert condition and is therefore available for line continuity checking in a manner that will now be explained. For this purpose, generator 29 at the main air force headquarters is producing a succession of direct-current slow pulses, each, for example, having a positive polarity and occurring for a 100-millisecond time interval at the beginning of each of a plurality of repetitive signaling cycles, each of a 3-second duration. These pulses are translated via transmitter 30 into corresponding frequency-modulated alternating-current pulses having a frequency centered at 2635 cycles per second. At the air force base 15, the alternating-current pulses are applied to the input of receiver 31 and translated thereby into corresponding direct-current pulses which are passed through slow pulse repeater 37 into the input of transmitter 35. In this transmitter, the direct-current pulses are again translated into corresponding frequency modulated alternating-current pulses having a frequency centered at 2465 cycles per second. These alternating-current pulses are transmitted over line 36 back to the main headquarters receiver 40 and translated thereby into corresponding direct-current pulses. These pulses are then supplied over circuit 43 to the input of a slow pulse receiver 44 whose output is connected to an alarm 45 for a purpose that will be presently described.

Referring back to the output of receiver 31 at the air force base, it will be understood, as hereinbefore mentioned, that the slow pulses will be rejected by the fast pulse receiver 32 but accepted and passed through the slow pulse repeater 37. It will be thus apparent that the fast pulses employed for announcing an impending alert on the system will not interfere with the operation of the circuit continuity checking of the signaling system whereas the slow pulses will not interefere with the announcement of the impending alert thereon. It will be further understood that an identical arrangement obtains in the main headquarters in which the output of receiver 40 is connected to the inputs of fast pulse receiver 41 and slow pulse receiver 44.

Referring now to FIG. 3, it will be seen that circuit 43 extending from the output of receiver 40 in FIG. 2 is connected to slow pulse receiver 44 at common input terminal 50 which is connected through capacitor 51 and resistor 52 in series to the control grid 53 of a pentode 54 and through capacitor 55 and resistor 56 in series to the control grid of a triode 57. Screen grid 57a of the pentode is directly connected to a +130-volt source 58. Further connections mentioned hereinafter to a +130-volt source will be understood to refer to the source 58. Suppressor grid 59 and cathode 60 of the pentode are connected to ground 61. Anode 62 of the pentode is connected through resistor 63 to the +130-volt source and through diode 64 and resistor 65 in series to the control grid of triode 66. Capacitor 67 has one plate grounded and an opposite plate joined to a common point of resistor 65 and diode 64. This diode has its anode 64a connected to pentode anode 62 and its cathode 64b to capacitor 67 and is thereby poled for the conduction of current flow in a direction from pentode anode 62 toward capacitor 67.

A source 68 of negative 48-volt voltage is connected through resistor 69 to the control grid of triode 66 whose anode is connected through the operating winding of an electromagnetic relay 70 to the +130-volt source. Further connections mentioned hereinafter to a negative 48-volt source will be understood to refer to the source 68. Relay contact 71 has one terminal grounded and another terminal connected to alarm 45. It will be understood that contact 71 is open when capacitor 67 is charged with a positive voltage relative to ground whereby the alarm is rendered inoperative and further that the alarm is rendered operative by the closure of contact 71 in response to the deactivation of the relay operating winding, when capacitor 67 is fully discharged or at least discharged below a certain magnitude, in a manner and for a purpose that will be presently explained. It will also be apparent that when capacitor 67 is discharged, a negative biasing voltage derived from the negative voltage source via resistor 69 for the control grid of triode 66 serves to cut off conduction therein thereby deactivating the relay operating winding to close contact 71; and that when capacitor 67 is charged with a positive voltage to at least a certain magnitude, such charge overcoming the last-mentioned biasing voltage effective on the control grid of triode 66 serves to establish conduction therein thereby activating the relay operating winding to open contact 71. Capacitor 67 will discharge via a series circuit including resistors 65 and 69, and the negative potential source to ground, under a condition that will be hereinafter mentioned. The afore-described circuitry including input terminal 50, capacitor 51, pentode 54, capacitor 67, triode 66 and relay 70, together with the associated circuitry, constitutes a signal channel whose function and operation will be subsequently described.

Armature 73 is engageable with either contact 74 joined to the +130-volt source or to contact 75 which is grounded, under control of generator 29 in a well-known manner for a purpose that will be presently explained. In this connection, it will be understood that a suitable relay circuit, not shown, synchronized by the fast and slow pulse generator 29 serves to actuate armature 73, for the various time intervals and in the several respects illustrated in FIG. 4, in a well-known manner. The cathode of triode 57 is grounded while the anode thereof is connected via load resistor 76 to the +130-volt source and through resistor 77 to starter anode 78 of a gaseous discharge tube 79. This tube has its main anode 80 directly connected to the +130 voltage source and its cathode 81 through resistor 82 to ground 83. A point 84 common to cathode 81 and resistor 82 is connected via lead 85 and resistor 86 to the control grid 53 of pentode 54 and resistor 52 for a purpose that will be subsequently mentioned.

A diode 87 and capacitor 88a are connected in parallel between the starter anode and cathode of the gas tube, with the diode having its cathode 87a connected to the starter anode of the gas tube and its anode 87b to terminal 89. This terminal common to cathode 81, resistor 82, anode 87b of diode 87 and one plate of capacitor 88a is also connected through the other plate of capacitor 88 and resistor 90 to armature 91. This armature is engageable with either contact 92 joined to the negative 48-volt source or to contact 93 connected to the +130-volt source as synchronized by pulse generator 29 in a well-known manner for a purpose that will be later explained. A diode 94 having its anode 94a connected to ground 95 and its cathode 94b to common terminal 89 is poled for conduction from the ground toward the common terminal and thereby to capacitor 88. The afore-described circuitry including capacitor 55, triode 57, capacitor 88 and the gas tube, together with the associated circuitry, constitutes a guard channel whose function and operation will be subsequently described.

In the operation of the invention according to FIGS. 2 and 3 for supplying to input terminal 50 in FIG. 3, the direct-current slow signaling pulses are originated in generator 29, transmitted in the circuit loop comprising transmitter 30, line 28, receiver 31, repeater 37, transmitter 35, line 36, receiver 40 and lead 43, and finally are supplied to the input terminal 50 of slow pulse receiver 44. The signal channel of FIG. 3 may be initially considered to be in such operative condition prior to the receipt of a slow signal pulse at input terminal 50 for the purpose of this explanation that pentode 54 and triode 66 are conducting, relay 70 is operated by the conduction in triode 66 to hold open contact 71 and thereby to withhold the activation of the alarm 45, and in the guard channel triode 57 is conducting and the gas tube is extinguished. As mentioned hereinafter, the pentode will be conducting except for a 100-millisecond interval following the receipt of each pulse at input terminal 50 in a manner that will be presently explained. It will be understood that the +130-volt voltage effective on the anode of triode 57, in the absence of otherwise controlling voltages on the associated control grid and cathode thereof, drives this triode into conduction whereas the +130-volt voltage effective on the main anode 80 of the gas tube together with the absence of voltages at the associated starter anode and cathode holds the gas tube extinguished.

Figure 4:
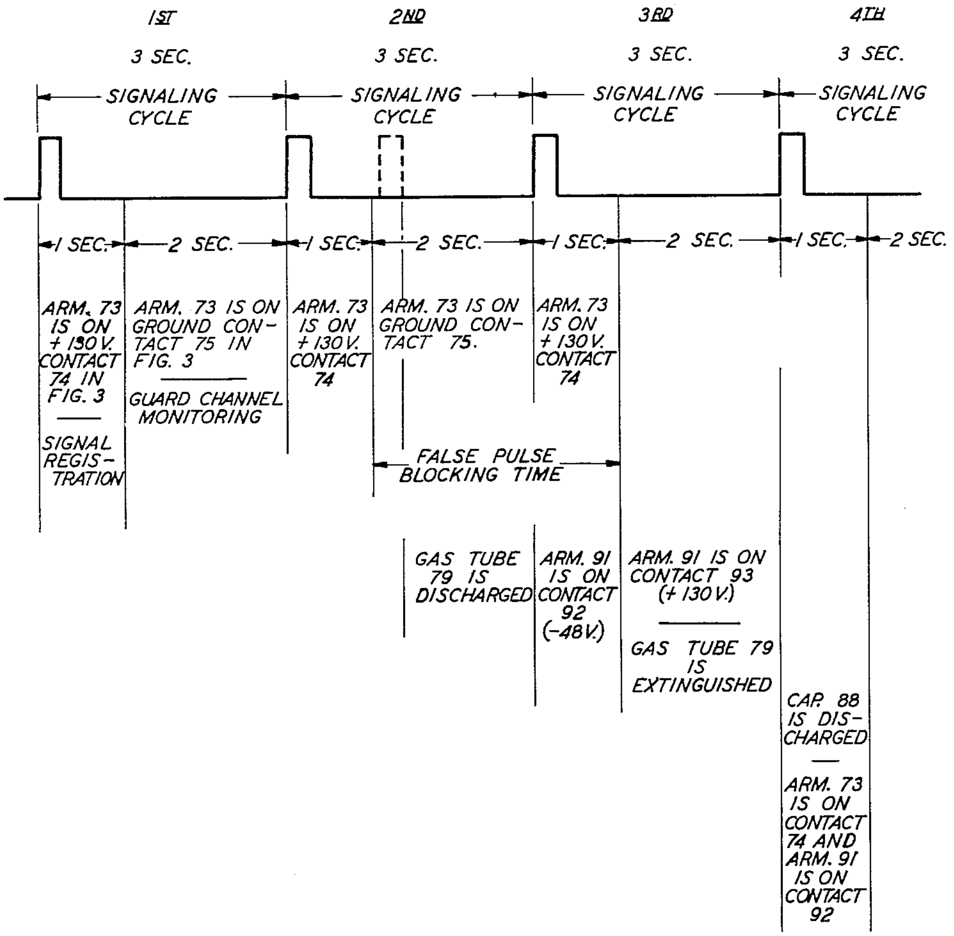

Let it be assumed for the start of the explanation of the operation of the present invention at this time, that a slow signal pulse is supplied via lead 43 to input terminal 50 during the first second of a first 3-second signaling cycle as illustrated in FIG. 4. This pulse would divide at the input terminal so that a first portion of the pulse would gradually charge capacitor 51 to an amount of the order of 120 volts while the pulse is being received at input terminal 50. At the end of the pulse, capacitor 51 will discharge via lead 43 to a negative point, not shown, in fast and slow pulse receiver 40 thereby causing the plate of the capacitor connected to the control grid of the pentode to drop to a negative voltage say, for example, to (−) 24 volts. This serves to bias the control grid of the pentode and thereby drive the latter to the nonconducting condition for a time period equal substantially to the duration of the received 100-millisecond pulse. As a consequence, the plate voltage of the pentode via resistor 63 rises approximately to the +130 volts of the source 58 whereupon capacitor 67 is charged via diode 64 to about +130 volts. This charge effective via resistor 65 on the control grid of triode 66 maintains the latter triode in the conductive condition. It will be recalled from the initial assumption of the circuit operation that triode 66 was in the conductive condition. It will be understood that the discharge path comprising resistors 65 and 69, and the negative voltage source 68 for the capacitor 67 is preferably provided with such time constant that the charge on the capacitor will maintain triode 66 in the conductive condition for a predetermined time interval say, for example, approximately 10 seconds following the completion of the arrival of the afore-noted signaling pulse at the input terminal 50 as shown in FIG. 5 for a purpose that will be subsequently mentioned. Diode 64 precludes the charge on capacitor 67 from leaking off through the pentode when the latter is conducting.

As a consequence of the last-mentioned maintenance of conduction in triode 66, relay 70 is held operated and the alarm 45 is withheld from activation for the afore-noted predetermined or 10-second time interval following the receipt of each normal signaling square-wave voltage pulse received at input terminal 50 as shown in FIG. 5. Eventually the charge on capacitor 51 will dissipate via lead 43 and the afore-noted negative point in receiver 40 and through series resistors 52, 86, and 82 to ground 83 whereupon in due course the negative bias effective on the control grid of the pentode is reduced to a value which permits the restoration of conduction therein. Thus, the afore-described discharge path for capacitor 51 is preferably provided with such time constant that enables the charge on capacitor 51 to hold the pentode in the nonconducting condition for a time interval which is substantially equal to the 100-millisecond time duration of each of the signal pulses. After discharge capacitor 51 then awaits the application of the positive pulse to input terminal 50, at the commencement of the second 3-second signaling cycle shown in FIG. 4. The afore-described charging of capacitors 51 and 67 and discharging of capacitor 51 constitute the normal operation of the signal channel to register each normal signal pulse received at input terminal 50, and requires approximately one second of each 3-second signaling cycle as shown in the first signaling cycle in FIG. 4.

Due to the previously mentioned division of the incoming voltage pulse at input terminal 50 during the first 1-second interval of the first signaling cycle shown in FIG. 4, a second portion of the same pulse places a charge on capacitor 55 with a magnitude tending in the direction of the positive 120-volt incoming signal pulse and corresponding to the magnitude of the afore-mentioned charge placed on capacitor 51 by the first portion of the same signal pulse. At the end of the pulse, capacitor 55 discharges via the +130-volt source and lead 43 to the negative point in receiver 40 thereby tending to cause the plate of capacitor 55 connected to the control grid of the triode to drop to a negative voltage. Such negative voltage would tend via resistor 56 to bias negatively the control grid of conducting triode 57 and would thereby tend to drive the latter into a nonconductive condition. At the same time, i.e., during the first 1-second interval of the first 3-second signaling cycle shown in FIG. 4, armature 73 is caused to engage contact 74 whereby a +130-volt voltage is applied via resistor 72 to the control grid of triode 57, as illustrated in FIG. 4. This +130-volt voltage overcomes the afore-mentioned negative biasing voltage due to the discharge of capacitor 55 in the afore-noted path whereby triode 57 is retained in the conductive condition.

At the end of the first 1-second signaling cycle, i.e., at the beginning of and during the next second of the first 3-second signaling cycle, shown in FIG. 4, armature 73 is caused to engage ground contact 75, and to remain thereon for the third and final second of the first 3-second signaling cycle illustrated in FIG. 4. Since it will be assumed at this point that a false pulse or a "hit" as further mentioned below has not been received at input terminal 50, then no further action will take place in the circuit of FIG. 3. Hence, this circuit will await the application of the signal pulse of the next-succeeding or second 3-second signaling cycle to input terminal 50. As a consequence of the maintenance of conduction in triode 57, the gas tube remains extinguished thereby holding inactive the afore-described guard circuit. Thus, the guard channel may be considered to monitor input terminal 50 for the reception of false or "hit" pulses after a normal signal pulse is received thereat in the first 3-second signaling cycle, as illustrated in FIG. 4. This completes the operation of the guard channel in response to a normal signal pulse originated in generator 29 and received at input terminal 50 during the first 3-second signaling cycle. The foregoing operations of the signal and guard channels for the first 3-second signaling cycle will be the same for each normal signaling pulse received at input terminal 50 in each of a plurality of normally repetitively 3-second signaling cycles shown in FIGS. 4 and 5, when no false or "hit" pulses are received at the same input terminal. Referring to FIG. 5, it will be seen that the 10-second interval for holding relay 70 operated is renewed by the corresponding charge added to capacitor 67 thereby indicating the registration of each normal signaling pulse received during each normal 3-second signaling cycle. Accordingly, it will be understood from the repetitively foregoing operation of FIG. 3 that the overall signaling circuit shown in FIGS. 1 and 2 is continuous and normal. This will be immediately apparent to the operating personnel at the main air force headquarters because of the lack of activation of the alarm thereat.

Let it be assumed now that a false positive voltage pulse or a "hit" established in lead 28 or 36 and due to an electrical phenomenon occurring outside the circuit of FIG. 2 is effectively applied to input terminal 50 during the 1-second period following the first 1-second period, i.e., during the second 1-second period of the second 3-second signaling cycle shown in FIG. 4. In this connection, it will be understood that the signal and guard channels operate to register the normal signal pulse during the first 1-second period of the second 3-second signaling cycle exactly as they operated to register the normal signal pulse during the first 1-second period of the first signaling cycle, as previously described. Now, however, the false pulse received at input terminal 50 will charge both capacitors 51 and 55 at the same time in the manner hereinbefore mentioned. At the end of the reception of the false pulse, the voltage charge on capacitor 51 will discharge and thereby tend to bias the control grid of the pentode to drive the latter into nonconduction in the manner hereinbefore mentioned; but such biasing voltage will, however, be rendered ineffective for that purpose by further action in FIG. 3 that will be subsequently explained. Hence, pentode 54 and triode 66 will remain conducting; relay 70 will remain operated; and the alarm 45 will remain deactivated. As a consequence, the false pulse will not be registered in the signal channel for reasons hereinafter explained.

As previously mentioned, the received false pulse also places a charge on capacitor 55 during the second 1-second period of the second 3-second signaling cycle, with the armature 73 resting on grounded contact 75 as shown in FIG. 3. Now, the negative voltage effective on the plate of capacitor 55 connected via resistor 56 to the control grid of triode 57 biases the latter into a nonconducting condition at the termination of the false pulse. As a consequence, the plate voltage of triode 57 effected through lead resistor 76 attains a maximum magnitude. This plate voltage applied through resistor 77 to starter anode 78 serves to institute discharge in the gas tube, in the second 1-second period of the second 3-second signaling cycle as illustrated in FIG. 4. This discharge takes place in a path including anode 80, cathode 81, point 84, resistor 82, and ground 83 whereby a voltage is developed across resistor 82. This voltage having a positive polarity at terminal 84 and applied through resistor 86 to the control grid 53 of pentode 54 overrides the negatively biasing voltage effective at the same time on the control grid 53 via capacitor 51 and tending to cut off conduction in the pentode, in response to the charge placed on the latter capacitor by the false pulse. Capacitor E connected across the main anode and cathode of gas tube 79 precludes false discharges thereof by extraneous voltages, in the manner well known in the art.

As a consequence, the pentode is maintained in the conducting condition at least until after the termination of the third and final 1-second period of the second 3-second signaling cycle and into the first 1-second period of the third 3-second signaling cycle as shown in FIG. 4, in a manner that will be presently described. Now, the normal signal pulse supplied to input terminal 50 in the last-mentioned cycle will charge capacitor 51 whose discharge will tend to bias the pentode to cut off conduction therein in the manner previously explained. This cutoff will not be achieved because such biasing voltage will be again overridden by the voltage developed across resistor 82 and effective at terminal 84, in response to discharge in the gas tube as hereinbefore mentioned. Obviously, this will preclude the registration of the normal signal pulse present in the first 1-second period of the third 3-second signaling interval, illustrated in FIG. 4. As previously pointed out, capacitor 51 will again discharge through series resistors 52, 86 and 82 to ground 83.

At the beginning of the first 1-second period of the third 3-second signaling cycle in which the normal pulse was not registered or at the end of the first 1-second period of any 3-second signaling cycle immediately following the 3-second signaling cycle having the reception of a false pulse therein, both last-mentioned 1-second periods being the same in time, armature 91 under control of pulse generator 29, in a manner similar to the control of armature 73 thereby, is caused to engage contact 92 whereby the negative 48-volt source is connected via resistor 90 to capacitor 88. This capacitor will now charge through a path including the 130-volt source connected to the anode 80 and cathode 81 of the gas tube, common terminal 89, capacitor 88, resistor 90, armature 91, contact 92, and the negative 48-volt source. Capacitor 88 will be so charged that its one plate connected via the common terminal 89 to the cathode 81 of the gas tube will have acquired thereon a voltage of about +48 volts. It will also be understood that the terminal of cathode 81 due to the afore-mentioned discharge in the gas tube will have a voltage of the order of +60 volts. Thus, a voltage of approximately +108 volts (+48 and +60) will be effective at the last-mentioned one plate of capacitor 88, i.e., the one plate connected to common terminal 89 and cathode 81.

At the end of the first 1-second period of the third 3-second signaling interval in which the normal pulse was not registered or at the end of the first 1-second period of any 3-second signaling cycle immediately following a 3-second signaling cycle including the reception of a false pulse, both last-mentioned 1-second periods being the same in time as previously mentioned, armature 91 controlled by the pulse generator 29 will be transferred from engagement with contact 92 to engagement with contact 93, as illustrated in FIG. 4. This connects the +130-volt source in series with the capacitor 88 thereby adding the +130-volt voltage to the above-noted +108-volt voltage now effective on the one plate of capacitor 88. As a consequence, a voltage "kick" of the order of +238 volts is simultaneously applied via common terminal 89 and diode 87 to the starter anode 78 and via common terminal 89 directly to the cathode 81 of the gas tube. This voltage "kick" will raise the voltages effective simultaneously on the starter anode 78 and cathode 81 to a value which is more positive than the voltage of +130 volts now effective on the associated main anode 80 whereupon the discharge in the gas tube will be extinguished. Thus, the gas tube will be extinguished at the end of the first 1-second period of the third 3-second signaling cycle, i.e., in the period in which the normal pulse was not registered, or at the end of the first 1-second period of any 3-second signaling cycle immediately following the 3-second signaling cycle including the reception of the false pulse therein, both last-mentioned 1-second periods being identical in time as previously mentioned. At this time, diode 87 precludes discharge between starter anode 78 and cathode 81.

Although a normal pulse will not be registered in the 3-second signaling cycle immediately following the 3-second signaling cycle including the reception of the false pulse therein because the pentode is maintained in the conducting condition by the voltage developed across resistor 82, due to discharge in the gas tube, overriding the biasing voltage effective on capacitor 51 due to the reception of the false pulse as hereinbefore explained, it will be understood that a normal pulse received in the first second of the fourth 3-second signaling cycle, i.e., in the second 3-second signaling cycle following the 3-second signaling cycle having the reception of a false pulse therein will be registered on a routine basis in the manner previously described herein in regard to the normal signal pulse received in the first 3-second signaling cycle shown in FIG. 4, unless another false pulse is received in the final 2-second period of the third 3-second signaling cycle. Diode 94 provides a discharge path for capacitor 88 at the start of the first 1-second period of the fourth 3-second signaling cycle shown in FIG. 4 in which the armature 91 is transferred under control of generator 29 from engagement with contact 93 to engagement with contact 92 thereby enabling capacitor 88 to discharge through the path including diode 94 and the negative 48-volt source as previously mentioned. This precludes the negative voltage effective at the discharge of capacitor 88 from reaching the control grid of pentode 54 via point 84, lead 85, and resistor 86 and thereby prevents prematurely conduction cutoff in the pentode which is normally conducting. It will thus be apparent that so long as at least one normal pulse is registered within the 10-second interval shown in FIG. 5, the circuit of FIGS. 1 and 2 will be considered to be free from interruptions and thereby to be continuous.

Thus, the gas tube in the guard channel functions on the reception of a false pulse at input terminal 50 to hold pentode 54 conducting in the signal channel thereby precluding the registration of the false pulse as well as that of the normal pulse in the 3-second signaling cycle immediately following the 3-second signaling cycle having the reception of the false pulse therein, as illustrated in FIG. 4. Also, the +130-volt source connected to armature 73 serves to hold triode 57 conducting during the registration of normal pulses in the successive 3-second signaling cycles whereas armature 73 grounded via terminal 75 serves to render triode 57 nonconducting in response to the reception of false pulses; and the negative 48-volt and +130-volt sources connected successively in that order to terminals 92 and 93, respectively, via armature 91 serve to provide sufficient voltage to extinguish discharge in the gas tube at the beginning of the second 1-second period in the 3-second signaling cycle immediately following the 3-second signaling cycle including the reception of a false pulse. This renders the guard channel operative to receive another false pulse in the proper time sequence as illustrated in FIG. 4.

Referring now to FIG. 4, it will be seen that in each 3-second signaling cycle, the first 1-second period may be identified as the normal pulse or signal registration time, and the remaining two seconds of the same cycle as the guard monitoring time; and that the false pulse blocking time may include the final 2-second period of one 3-second signaling cycle and the first 1-second period of the next-succeeding 3-second signaling cycle. While the foregoing description concerns the operation of FIG. 3 in response to a false pulse received at input terminal 50 in the second 1-second period of a given 3-second signaling cycle, it will be understood that the identical operation ensues in FIG. 3 in response to a false pulse received in the third 1-second period of the given 3-second signaling cycle, the only difference being in the time delay occasioned in the operation of the circuit of FIG. 3 by the last-mentioned false pulse. A minimum of one normal pulse should be received in each 10-second time interval shown in FIG. 5 in order to hold relay 70 operated for precluding the operation of the alarm 45, in FIG. 3. This will provide continuous checking of the circuit of FIGS. 1 and 2 to indicate the continuity thereof.

It is to be further understood that the above-described embodiment is merely illustrative of the application of the invention. Numerous other embodiments may occur to those skilled in the art without departing from the spirit and scope of the invention.

What is claimed is:

1. In a circuit for continuously checking the continuity of a signaling system by registering repetitive signal voltage pulses, each having a predetermined time duration and occurring once at the beginning of each of a plurality of repetitive signaling cycles of preselected time duration but blocking the registration of false pulses received subsequent to the signal pulses in the respective signaling cycles, said signal and false pulses being transmitted on said signaling system, said circuit receiving said signal pulses after their transmission on said signaling system and comprising an input for said signal and false pulses, an amplifier device including a control grid and an anode and normally activated to conduction, a first capacitor charged by each received signal pulse of the respective signaling cycles, said first capacitor discharging through said conducting device upon the termination of each received signal pulse to bias said grid for driving said device into nonconduction for a time interval substantially equal to the time duration of each received signal pulse whereby said anode attains substantially maximum voltage, resistive means connected between ground and a point common to said first capacitor and said grid for discharging said last-mentioned capacitor thereby restoring conduction in said device, a load, a second capacitor having one terminal connected to ground and an opposite terminal connected to said anode and load whereby said last-mentioned capacitor is charged to the voltage of said anode during the nonconduction of said device for energizing said load to register each received signal pulse, and means connected between said input and an intermediate point on said resistive means to monitor said input for false pulses received thereat after the registration of the received signal pulses in the respective signaling cycles, said monitoring means being deactivated when none of said last-mentioned false pulses are received at said input after the registration of the received signal pulses in the respective signaling cycles, said first capacitor being charged by a false pulse received at said input after the registration of the received signal pulse in a given signaling cycle whereby said last-mentioned capacitor charge tends to bias said grid for driving said device into nonconduction, said monitoring means being activated by the last-mentioned received false pulse to cause current flow in the portion of said resistive means between said intermediate point and ground to develop a voltage across said resistive portion for overriding the last-mentioned bias on said grid to maintain said device in conduction thereby blocking the registration of the false pulse in said given signaling cycle, said registration of successively received signal pulses within at least a further predetermined time interval indicating the continuity of said signaling system.

2. The circuit according to claim 1 in which said first capacitor and said resistive means discharging path therefor have such time constant that the charge on said last-mentioned capacitor holds said amplifier device in the nonconducting condition for a time interval which is substantially equal to the predetermined time duration of each of the received signal pulses.

3. The circuit according to claim 2 which includes further resistive means for discharging said second capacitor, said second capacitor and last-mentioned discharging resistive means having such time constant that the charge on said last-mentioned capacitor energizes said load for a time interval which is at least longer than the time duration of the respective signaling cycles.

4. The circuit according to claim 3 in which the time constant of said first capacitor and discharging resistive means therefor and the time constant of said second capacitor and said discharging further resistive means therefor constitute substantially the signal registration time periods at the beginning of the respective signaling cycles.

5. The circuit according to claim 4 in which said time constants of said first and second capacitors and said respective discharging resistive means therefor provide other time periods following the signal registration time periods in the respective signaling cycles for enabling said monitoring means to monitor said input for false pulses occurring in said other time periods of the respective signaling cycles.

6. In a circuit for continuously checking the continuity of a signaling system by registering repetitive signal voltage pulses, each having a predetermined time duration and occurring once at the beginning of each of a plurality of repetitive signaling cycles of preselected time duration, and for monitoring false voltage pulses received after the signal pulses in the respective signaling cycles, said signaling and false pulses being transmitted on said signaling system, said circuit receiving said signal pulses after their transmission on said signaling system and comprising an input terminal for said signal and false pulses, a first amplifying device including at least a control grid and an anode and normally in a conducting condition, a first capacitor charged by a signal pulse received at said input terminal, said first capacitor discharging in the reverse direction through said terminal after the end of each received signal pulse for so biasing said control grid as to drive said device to a nonconducting condition for a time interval substantially equal to the time duration of each received signal pulse, resistive means connecting a point common to said capacitor and control grid to ground to discharge said capacitor for restoring conduction in said device, further means connected to said anode and energized in response to the nonconducting condition in said device, said charge and discharge of said first capacitor and said nonconducting condition in said first device cooperating to register each signal pulse received at said input terminal whereby said last-mentioned signal pulse registration serves to energize said further means for a further predetermined time interval which is at least longer than said preselected time durations of the respective signaling cycles, and additional means connected between said input terminal and an intermediate point of said resistive means to monitor said last-mentioned terminal for occurrences of false pulses thereat after said last-mentioned signal pulses have been registered in the respective signaling cycles, said registration of successively received signal pulses within said further predetermined time interval indicating the continuity of said signaling system.

7. The circuit according to claim 6 in which said additional means is normally deactivated and remains deactivated when no false pulses are received at said input terminal during time intervals remaining in the respective signaling cycles after the received signal pulses are registered therein.

8. The circuit according to claim 7 in which said first capacitor is charged and said additional means is activated by a false pulse received at said input terminal in the remaining time interval, in a given signaling cycle after the received signal pulse is registered therein, said last-mentioned charged first capacitor discharging through said conducting first device and thereby tending to bias said first device control grid for establishing the nonconducting condition in said first device, said last-mentioned activation of said additional means causing a current to flow in a portion of said resistive means between said intermediate point and ground for developing a voltage across said last-mentioned resistive means portion, said last-mentioned voltage applied through the remaining portion of said resistive means to said first device control grid for overriding said last-mentioned biasing tending of said last-mentioned discharging first capacitor to maintain said first device in the conducting condition thereby blocking the registration of said last-mentioned false pulse in said given signaling cycle.

9. The circuit according to claim 6 in which said further means includes a second capacitor connected between ground and said anode, said second capacitor charged substantially to the voltage of said anode each time said first device is changed to the nonconducting condition.

10. The circuit according to claim 9 which includes further resistive means connected between said second capacitor ground and a point common to said anode and second capacitor to discharge partially said last-mentioned capacitor each time said first device returns to the conducting condition in the respective signaling cycles.

11. The circuit according to claim 6 in which said further means comprises a second amplifying device including at least a control grid and an anode, said last-mentioned device normally biased to a nonconducting condition, an electromagnetic relay having its operating winding connected in circuit with said last-mentioned anode so that said relay is normally unoperated, a contact included in said relay and closed when said relay is unoperated, an alarm circuit connected to said contact and activated when said contact is closed, a second capacitor having one plate grounded and an opposite plate connected to said first device anode and said second device control grid, said second capacitor charged to the anode voltage of said first device when said first device is in the nonconducting condition to supply a positive voltage for overcoming the normal biasing voltage on said second device control grid thereby driving said second device into the conducting condition, said last-mentioned conducting condition of said second device energizing said operating winding for operating said relay thereby opening said contact to deactivate said alarm circuit, said charge and discharge of said first capacitor and said second capacitor charge cooperating to register each signal pulse, said last-mentioned second capacitor charge holding said second device in the conducting condition for energizing said relay winding thereby holding open said contact to deactivate said alarm circuit for said further predetermined time interval.

12. The circuit according to claim 7 in which said additional means includes a second capacitor having one plate connected to said input terminal and charged by said signal pulses received thereat and registered in the respective signaling cycles, a second amplifying device including at least a control grid and anode, said last-mentioned grid connected to another plate of said second capacitor and said last-mentioned anode coupled to said intermediate resistive means point, said second device grid normally biased to maintain said second device in the conducting condition for withholding a flow of current through a portion of said resistive means lying between said intermediate point and ground thereby precluding the development of a voltage across said last-mentioned resistive portion, said charged second capacitor discharging through said conducting second device for biasing said second device grid thereby tending to drive said second device to the nonconducting condition, and a source of positive voltage connected to said second device grid for overriding the last-mentioned biasing of said second device grid due to the last-mentioned discharge of said second capacitor thereby maintaining said second device in the conducting condition when no false voltage pulses are received at said input terminal in the respective signaling cycles after the received signal pulses are registered therein.

13. The circuit according to claim 11 which includes other means comprising a source of negative voltage for normally biasing said grid of said second device with negative voltage to drive said last-mentioned device into the nonconducting condition when said second capacitor has a voltage charge of less than a certain amount, and first unidirectional means connected between said first device anode and said last-mentioned control grid and source and poled to block the flow of current between said last-mentioned source and anode.

14. The circuit according to claim 11 in which said additional means comprises a third capacitor, said third capacitor having one plate connected to said input terminal, a ground terminal connected to another plate of said third capacitor after the signal pulse is registered in a given signaling cycle, said first capacitor and said third capacitor charged by a false pulse received at said input terminal during a further time interval remaining in said given signaling cycle after the signal pulse is registered therein, said last mentioned charged first capacitor discharging in the reverse direction through said input terminal thereby tending to bias said first device into the nonconducting condition for registering said false pulse, a third amplifying device including an anode and a control grid connected to another plate of said third capacitor, said third device normally in the conducting condition, said charged third capacitor discharging in the reverse direction through said input terminal to bias said third device into the nonconducting condition for raising the anode voltage of said third device to a maximum value, a gaseous discharge tube including a starter anode, a main anode, and a cathode, said starter anode connected to said third device anode, said main anode connected to a positive source of voltage, and said cathode connected to said intermediate point on said resistive means, said tube normally resting in a nondischarge condition but activated into the discharge condition by the maximum third device anode voltage whereby discharge current of said tube flows in a portion of said resistive means lying between said intermediate point and ground to develop a voltage across said last-mentioned portion, said last-mentioned voltage applied through another portion of said resistive means to said first device grid for overriding the biasing voltage thereon due to the last-mentioned discharged said first capacitor thereby maintaining said first device in the conducting condition to block the registration of said false pulse received during said further time interval remaining in said given signaling cycle.

15. The circuit according to claim 14 which includes a fourth capacitor having one plate connected to said third device anode, starter anode and gas tube cathode and an opposite plate connected to a source of negative voltage at the start of the signaling cycle next following said given signaling cycle whereby said one plate of said fourth capacitor is charged with the voltage effective at said last-mentioned cathode during said last-mentioned gas tube discharge and the voltage of said negative source, said fourth capacitor opposite plate next connected to said positive voltage source at the end of said last-mentioned next following signaling cycle for adding the positive voltage of said last-mentioned source to the last-mentioned added positive voltages then on said one plate of said fourth capacitor whereby the cumulative voltage charge on said last-mentioned one capacitor plate applied simultaneously to said gas tube starter anode and cathode will raise the voltage on said last-mentioned starter anode and cathode above the positive voltage then on said gas tube main anode to extinguish the discharge in said gas tube, said last-mentioned extinguishment of the discharge in said gas tube preventing the registration of the signal pulse received at said input terminal in the second signaling cycle following said given signaling cycle, and means for discharging said fourth capacitor as said last-mentioned capacitor is connected to said negative voltage source at the beginning of said last-mentioned second signaling cycle thereby returning said gas tube to the nondischarge condition for enabling said third capacitor to monitor said input terminal for the occurrence thereat of a false pulse in said last-mentioned second signaling cycle.

16. The circuit according to claim 15 which includes second unidirectional means which connects said one plate of said fourth capacitor to said gas tube starter anode and cathode, said last-mentioned means being poled for current conduction in the direction from said gas tube cathode to said starter anode thereby precluding current discharge between said starter anode and said gas tube cathode.

17. The circuit according to claim 16 which includes third unidirectional means connected between said one plate of said fourth capacitor and ground, said last-mentioned means being poled for current conduction from ground to said last-mentioned one plate to provide a discharge path therethrough for said fourth capacitor thereby precluding any negative charge on said fourth capacitor from biasing said first device control grid to drive prematurely said first device into the nonconducting condition.

18. In a circuit for continuously checking the continuity of a signaling system by registering signal voltage pulses of positive polarity, each occurring once at the beginning of each of a plurality of repetitive signaling cycles of preselected time duration and by monitoring for false voltage pulses received subsequent to the signal pulses in the respective signaling cycles, said signal and false pulses being transmitted on said signaling system, said circuit receiving said signal and false pulses after their transmission on said signaling system and comprising an input terminal, a first amplifier including at least a control grid and an anode, a source of positive voltage to activate said anode for normally instituting conduction in said first amplifier, a first capacitor charged substantially to the magnitude of the voltage of each pulse received at said input terminal, a first resistor, said first capacitor and first resistor connected in series between said input terminal and grid, said first capacitor discharging through said conducting first amplifier upon the termination of each received signal pulse to bias said grid for driving said first amplifier into nonconduction for a time interval substantially equal to the time duration of each received pulse, a second amplifier including a control grid connected to said first amplifier anode and also including an anode, said last-mentioned grid being normally so biased as to drive said second amplifier into nonconduction, a second capacitor having one plate connected to ground and an opposite plate to said first amplifier anode and second amplifier grid, said second capacitor charged substantially to the magnitude of the positive anode voltage of said first amplifier upon the establishment of nonconduction therein, said second capacitor applying its positive charge to said second amplifier grid to override the normal negative bias thereon for establishing conduction in said second amplifier, an alarm circuit, an electromagnetic relay having a contact connectable to and disconnectable from said alarm circuit and having its operating winding connected in circuit with said second amplifier anode, said winding being energized to operate said relay in response to conduction in said second amplifier for holding said contact opened thereby deactivating said alarm circuit while said relay is operated, a resistive discharge circuit for said second capacitor, said second capacitor and discharge circuit therefor having such time constant as to maintain conduction in said second amplifier for a further predetermined time interval which is in excess of said preselected time interval after each signal pulse received at said input terminal thereby holding both said relay operated and said contact opened to deactivate said alarm circuit for a time interval corresponding to said further predetermined time interval, and second and third resistors connected in series between ground and a common terminal of said first resistor and said first amplifier grid whereby said charge on said first capacitor is dissipated through said first, second and third resistors to remove the negative bias from the control grid of said first amplifier for restoring conduction therein, said charging and discharging of said first capacitor and said charging of said second capacitor constituting a signal registration period for each signaling cycle, and a guard channel to monitor said input terminal for false pulses occurring during the portions of the respective signaling cycles remaining after said signal registration periods thereof, comprising a third capacitor charged simultaneously with and to the same voltage magnitude as said first capacitor by each pulse received at said input terminal, a third amplifier including a control grid and an anode and normally conducting before pulses are received at said input terminal, said charged third capacitor discharging through said conducting third amplifier grid to tend to bias said third amplifier into nonconduction, a first movable terminal connectable alternately between said positive voltage source and a ground terminal, said first movable terminal initially connecting said positive source to said third capacitor and said third amplifier grid to nullify the biasing effect of the last-mentioned discharge of said third capacitor thereby maintaining conduction in said third amplifier during the signal registration portion of each signaling cycle, said third capacitor discharging through said positive voltage source during said last-mentioned signal registration portion, said first movable terminal next connecting ground to said discharged third capacitor and said third amplifier grid to monitor said input terminal for false pulse during said remaining portions of the respective signaling cycles whereby the normal conduction in said third amplifier is unaffected when no false pulses are received at said input terminal during said last-mentioned remaining portions.

19. The circuit according to claim 18 in which a false voltage pulse received at said input terminal during said remaining portion of a given signaling cycle charges said first capacitor which discharges through said conducting first amplifier thereby biasing the control grid thereat and tending to bias said first amplifier into nonconduction, and said third capacitor being simultaneously charged by the false pulse through said ground terminal which is now connected to said first movable contact whereby said third capacitor charge serves to bias said grid of said third amplifier for terminating conduction therein, said last-mentioned circuit also including a gas tube having a starter anode, a main anode and a cathode, said last-mentioned anode connected to said positive voltage source so that said gas tube is normally in a nondischarge condition, said last-mentioned cathode connected to a terminal common to said second and third resistors, means to apply the anode voltage of said last-mentioned nonconducting third amplifier to said starter anode for instituting discharge in said gas tube, said last-mentioned discharged tube discharging through said associated cathode and third resistor to ground whereby said gas tube cathode has a certain magnitude of positive voltage produced at said last-mentioned cathode, said third resistor developing thereacross a positive voltage which is applied through said second resistor to said first amplifier grid to nullify the last-mentioned biasing tendency of said discharging first capacitor whereby said first amplifier is maintained in conduction until after the termination of said remaining portion of said given signaling cycle, said last-mentioned maintenance of said first amplifier conduction blocking the registration of the received false pulse during said last-mentioned remaining portion of said given signaling cycle as well as to block the registration of the signal pulse occurring at the beginning of the signaling cycle next-following said given signaling cycle, a fourth capacitor having one plate connected to said gas tube starter and cathode anode, said fourth capacitor charged to the certain voltage of said gas tube cathode, a second movable terminal connectable alternately to said positive potential source and a source of negative potential, said second movable terminal connected to said negative source during a portion of a signaling cycle next following said given signaling cycle for adding to said fourth capacitor a positive voltage charge comprising substantially the magnitude to the voltage of said negative source, said second movable terminal connected to said positive voltage source at the end of the remaining portion of said last-mentioned next-following signaling cycle for adding the full magnitude of the voltage of said last-mentioned positive voltage charge then on said fourth capacitor whereby the cumulative voltage charge thereon is applied simultaneously to said gas tube starter anode and cathode to extinguish the discharge in said gas tube, said last-mentioned extinguishment of discharge in said gas tube precluding the registration of the signal pulse occurring in the beginning of the second signaling cycle following said given signaling cycle, said cumulative charge on said fourth capacitor discharging as said second movable terminal is connected to said negative source at the beginning of said last-mentioned second following signaling cycle to condition said guard circuit to monitor said input terminal for a false pulse rendered thereat in the remaining portion of said last-mentioned second following signaling cycle.

No references cited.